Dec. 16, 1952          C. O. DONLEY          2,621,988

BEARING AND METHOD OF MAKING THE SAME

Filed May 28, 1948

Inventor
Carson O. Donley
By Spencer, Willits, Helmig & Baillio
Attorneys

Patented Dec. 16, 1952

2,621,988

UNITED STATES PATENT OFFICE 2,621,988

BEARING AND METHOD OF MAKING THE SAME

Carson O. Donley, Indianapolis, Ind., assignor to General Motors Corporation, Detroit, Mich., a corporation of Delaware Application May 28, 1948, Serial No. 29,678

10 Claims. (Cl. 308—237)

This invention has to do with bearings lined with antifriction metal and the primary object of the invention is to provide an improved bearing comprising silver wherein the silver is protected from corrosion caused by lubricating oils which contain sulphur.

Silver bearings have been employed heretofore, either with or without a thin overlay of softer metal such as lead-tin or lead-indium, etc. Silver bearings without the overlay are corroded by lubricants which contain sulphur. Where the thin overlay is employed it has been common to produce it by first electrodepositing a thin layer of lead onto the silver, then electrodepositing a thin layer of indium or tin onto the lead and then heat treating the bearing to cause the indium or tin to diffuse into the lead. The indium or tin protects the lead from corrosion but does not diffuse into the silver so that if the thin overlay is scratched, scored or worn away, the silver is subject to attack by lubricating oils which contain sulphur and the like.

I have discovered that a silver bearing may be plated with a thin coating of tin and the tin diffused into the silver by a diffusion heat-treatment and that bearings so processed are highly resistant to corrosion caused by lubricants which contain sulphur. In practice the tin is applied as an electrodeposited coating having a thickness within the range of approximately .00005 to .0002 inch. The temperature employed for the diffusion heat-treatment is within the range of approximately 600°–1000° F. for a time of about ten minutes or more. Where temperatures of not more than about 800 °F. are employed extended periods of heat treatment may be employed, for example, as much as ten hours or more. The upper limit of time at the higher temperatures of 900°–1000° F. is determined by the diffusion depth. At more than about two hours at 1000° F. an undesirable depth of penetration is obtained, resulting in a low concentration of tin in the silver in the diffused zone. The silver should have at least about 2% tin by weight in the diffused zone to be inhibited against sulphur corrosion. At present it is preferred to employ a tin plate of .0001 inches thick, diffused at 30 minutes at 900° F.

The following are other illustrative examples of conditions which have been employed with satisfactory results:

| Tin Thickness, Inches | Diffusion Temp., Degrees F. | Diffusion Time |
|---|---|---|
| .00005 | 600 | 10 min. to 10 hours. |
| .00005 | 800 | Do. |
| .00005 | 1,000 | 10 min. to 2 hours. |
| .00010 | 600 | 10 min. to 10 hours. |
| .00010 | 800 | Do. |
| .00010 | 1,000 | 10 min. to 2 hours. |
| .00020 | 600 | 10 min. to 10 hours. |
| .00020 | 800 | Do. |
| .00020 | 1,000 | 10 min. to 2 hours. |

The diffusion heat treatment may be carried out in air, when temperatures of not above 1000° F. are employed. Where temperatures higher than 1000° F. are used, a neutral or reducing furnace atmosphere should be maintained. The neutral or reducing atmosphere also may be used, if desired, for the diffusion temperatures of 1000° F. and less.

My improved bearing having a thin layer of tin diffused into the silver may be used with or without an overlay of softer metal. For heavy loaded bearings it is preferred to employ a thin overlay of lead-indium, lead-tin, etc. The lead may be electrodeposited onto the surface of the bearing after the tin has been diffused onto the silver, the indium or tin electrodeposited onto the lead, and the metals heated to diffuse the indium or tin into the lead. Another method of forming an overlay of lead-indium or lead-tin is to codeposit electrolytically the lead and indium or lead and tin in the desired proportions. The thickness of the overlay of soft metal (where it is employed) normally is the same as that sometimes employed heretofore with silver bearings. In general the total thickness of the overlay may be within the approximate limits of .0005 to .003″.

Ordinarily the silver layer of my improved bearing is supported by a backing or bearing support of a harder or stronger metal such as steel or the like. Usually also there is provided a flash or strike electrodeposit of copper or nickel onto the steel backing onto which the silver is electrodeposited to the desired thickness. The flash or strike of copper or nickel is of assistance in forming a strong bond between the silver and the supporting backing of steel. In some cases the flash coating may be omitted and the silver electroplated directly to the steel backing. A suitable procedure for accomplishing this is described in the Martz Patent 2,431,947 dated December 2, 1947.

For a bearing using a copper strike, a copper thickness of about .000020" is preferred, with the practical range being about .0000050" to .000100" in thickness. Using a nickel strike, a nickel thickness of about .000010" is presently preferred, with the practical range being from about .000005" to .000100" in thickness.

The thickness of the silver in my improved bearing may be the same as that of ordinary silver bearings. In general the thickness may be within the thickness range of about .005" to .100". In many cases thickness of .015" to .025" are employed. The silver preferably is applied by electrodeposition either to the flash coated steel back, or, if desired, directly to the steel back. Usually the electrodeposited silver is annealed after machining to the desired thickness. Where either the nickel or copper strike is applied an annealing temperature of 975° F. for an hour is normally employed. In the case of a copper strike it is preferred not to anneal the silver above about 1200° F. because of the formation of a relatively weak copper-silver eutectic alloy with a consequent weakening of the bond. In the case of a nickel strike the maximum annealing temperature is about 1400° F. Where temperatures of about 1050° F. or higher are employed for the annealing operation it is necessary to employ a neutral or reducing atmosphere. Temperatures much lower than 975° F. also may be employed. In fact temperatures down to as low as room temperature may be used, depending on the characteristics of the silver bearing material which are desired. In some instances the annealing and tin diffusing heat treatments may be combined, although this is not preferred.

Reference is herewith made to the accompanying drawing in which.

Figure 1:
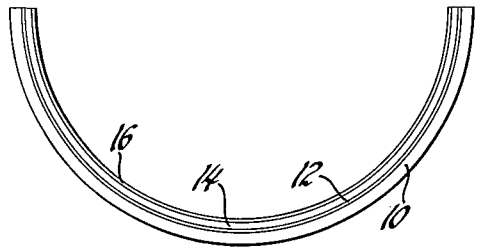
Figure 1 is an end view of one-half of an engine bearing in accordance with one embodiment of the invention.
Figure 2:
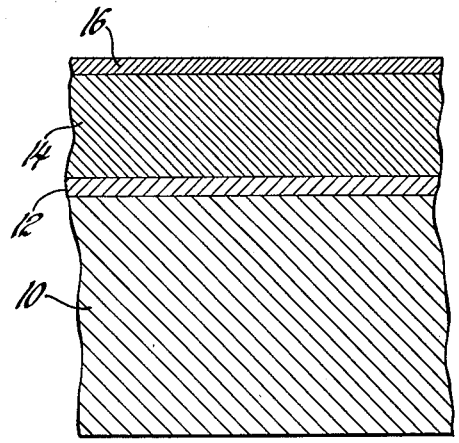
Figure 2 is a section on an enlarged scale showing the several layers of metal prior to diffusion of tin into the silver layer.
Figure 3:
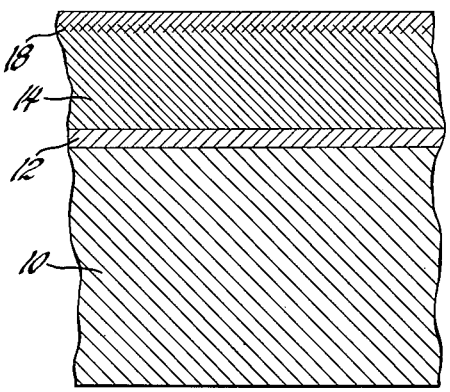
Figure 3 is a view similar to that of Figure 2 except that the tin is shown diffused into the silver layer.

Referring especially to Figures 1, 2 and 3, there is shown at 10 a backing of strong metal such as steel. To the backing is applied a thin flash or strike 12 of nickel or copper. To the strike there is applied an electrodeposited coating of silver represented at 14. A thin coating 16 of tin is electrodeposited onto the silver. Figure 3 represents the structure after a heat treatment to diffuse tin onto the silver. The diffused zone of tin-silver is represented by 18.

Figure 4:
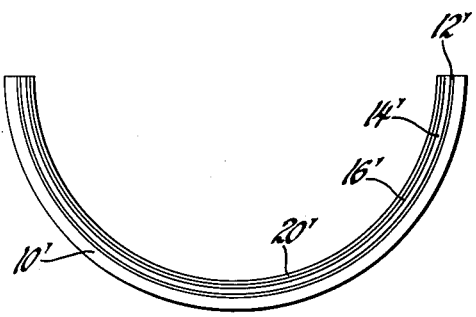
Figure 4 is a view similar to that of Figure 1 except that the bearing has a soft metal overlay.
Figure 5:
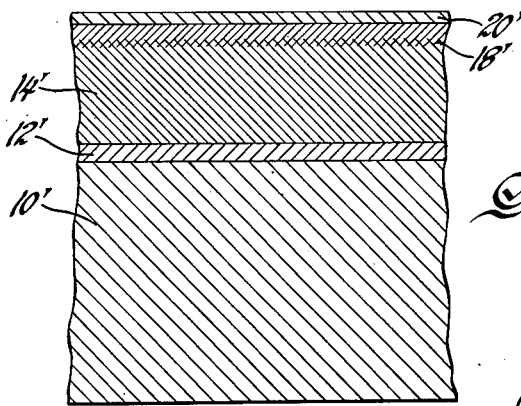
Figure 5 is a sectional view on an enlarged scale of the bearing of Figure 4 showing tin diffused into the silver and an overlay of soft metal.

The construction of the bearing of Figures 4 and 5 is generally similar to that of the modification of Figures 1, 2 and 3 except that the bearing includes an overlay of soft bearing metal. In Figures 4 and/or 5, 10' indicates a backing of strong metal such as steel, 12' represents a flash or strike of nickel or copper, 14' represents a layer of silver bonded to the copper or nickel, 16' a thin coating of tin, 18' a diffused layer of tin-silver and 20' a thin overlay of soft bearing metal such as lead-tin or lead-indium.

Various changes and modifications of the embodiments of my invention described herein may be made by those skilled in the art without departing from the spirit and scope of the invention.

I claim:

1. The method of making a bearing which comprises providing a bearing backing of steel, electrodepositing a flash coating of a metal of the class consisting of copper and nickel onto the steel, said flash having a thickness within the range of .000005"–.0000100", electrodepositing silver onto said flash coating to a thickness within the range of about .005 to .100, electrodepositing tin to a thickness with the range of .00005"–.00020" onto the silver, and heat treating the product of the preceding steps to a temperature within the range of 600°–1000° F. for at least about 10 minutes to diffuse the tin into the silver to provide desired corrosion resistance.

2. The method as in claim 1 which includes the step of annealing the silver prior to electrodepositing the tin thereon.

3. The method as in claim 1 which includes the step of applying an alloy layer of the class consisting of lead-tin and lead-indium alloys having a thickness of about .0005"–.003" to the diffused tin-silver surface.

4. The method of forming a bearing which comprises providing a supporting back of relatively hard and strong metal, bonding to said back a layer of silver having a thickness within the approximate range .005" to .100", electrodepositing a coating a tin having a thickness within the approximate range .00005" to .00020" to the silver, and then heating the back, silver and tin to a temperature in excess of the melting point of tin and for a time not less than ten minutes and up to a time sufficient to produce a diffusion of tin in the silver until the diffusion layer contains tin amounting to not less than about 2% by weight of the silver.

5. The method of forming a bearing which comprises providing a supporting back of relatively hard and strong metal, bonding to said back a layer of silver having a thickness within the approximate range .005" to .100", electrodepositing a coating of tin having a thickness within the approximate range .00005" to .00020" to the silver, and then heating the back, silver and tin to a temperature between approximately 600° and 1000° F., and for a time not less than ten minutes but sufficient to produce a diffusion of the tin into the silver until the percentage of tin in the diffusion layer amounts to not less than approximately 2% by weight of the silver.

6. A bearing comprising a rigid metal backing having a layer of silver bonded thereon, and a diffusion of tin in the exposed surface of said silver layer, said tin constituting at least about 2% by weight of the silver.

7. A bearing comprising a rigid metal backing, a layer of silver bonded to said backing and having a thickness within the approximate range .005" to .100", and a diffusion of tin in the surface of the silver, said tin constituting at least about 2% by weight of the silver.

8. A bearing as set forth in claim 7 in which a thin layer of metal of the class consisting of copper and nickel is interposed between the backing and the silver.

9. A bearing as set forth in claim 7 wherein a thin overlay of lead-base bearing metal is bonded to the exposed surface of said diffused tin-silver surface.

10. A bearing as set forth in claim 7 wherein a layer of metal of the class consisting of copper and nickel is interposed between the backing and the silver, and an overlay of lead-base bearing material is bonded to the exposed surface of the diffused tin-silver surface.

CARSON O. DONLEY.

REFERENCES CITED

The following references are of record in the file of this patent:

UNITED STATES PATENTS

| Number | Name | Date |
|---|---|---|
| 2,078,868 | Oplinger | Apr. 27, 1937 |
| 2,141,201 | Tausz | Dec. 27, 1938 |
| 2,266,319 | Hobbs | Dec. 16, 1941 |
| 2,375,224 | Hensel | May 8, 1945 |
| 2,386,951 | Howe | Oct. 16, 1945 |
| 2,431,947 | Martz | Dec. 2, 1947 |
| 2,448,369 | Heintz | Aug. 31, 1948 |
| 2,469,878 | Hannon | May 10, 1949 |